United States Patent
Kanda et al.

(10) Patent No.: US 11,232,313 B2
(45) Date of Patent: Jan. 25, 2022

(54) ABNORMALITY DETECTION DEVICE, ABNORMALITY DETECTION SYSTEM, AND ABNORMALITY DETECTION PROGRAM

(71) Applicant: TOYOTA JIDOSHA KABUSHIKI KAISHA, Toyota (JP)

(72) Inventors: Ryo Kanda, Nisshin (JP); Koichi Suzuki, Miyoshi (JP); Daiki Kubo, Toyota (JP); Koichiro Mitsumaki, Nagoya (JP); Miku Ando, Miyoshi (JP); Shunji Tateishi, Kasugai (JP); Yoshitaka Masuda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 16/597,045

(22) Filed: Oct. 9, 2019

(65) Prior Publication Data
US 2020/0184243 A1 Jun. 11, 2020

(30) Foreign Application Priority Data
Dec. 10, 2018 (JP) .............................. JP2018-231198

(51) Int. Cl.
G06K 9/00 (2006.01)
H04N 5/225 (2006.01)
B60R 11/04 (2006.01)

(52) U.S. Cl.
CPC ..... *G06K 9/00845* (2013.01); *G06K 9/00315* (2013.01); *G06K 9/00342* (2013.01); *H04N 5/2253* (2013.01); *B60R 11/04* (2013.01)

(58) Field of Classification Search
CPC ........... G06K 9/00845; G06K 9/00342; G06K 9/00315; G06K 9/00302; G06K 9/6284; G06K 99/00845; H04N 5/2253; B60R 11/04; B60R 1/00; G08B 21/18; B60W 40/08; B60W 50/14; B60W 2040/0818; G06F 3/017; B60K 28/066
USPC ........................................................ 382/103
See application file for complete search history.

(56) References Cited

U.S. PATENT DOCUMENTS

| | | | |
|---|---|---|---|
| 9,751,534 B2* | 9/2017 | Fung | G16H 50/20 |
| 9,925,987 B1* | 3/2018 | Nguyen | G08G 1/0129 |
| 2006/0188130 A1* | 8/2006 | Park | G06K 9/00248 |
| | | | 382/103 |
| 2007/0040705 A1* | 2/2007 | Yoshioka | G08G 1/0969 |
| | | | 340/988 |
| 2008/0288140 A1* | 11/2008 | Matsuno | B60W 40/04 |
| | | | 701/41 |
| 2009/0179777 A1* | 7/2009 | Ishikawa | G01M 15/042 |
| | | | 340/939 |

(Continued)

FOREIGN PATENT DOCUMENTS

| | | |
|---|---|---|
| CN | 103714660 A | 4/2014 |
| CN | 104704541 A | 6/2015 |

(Continued)

*Primary Examiner* — Mahendra R Patel
(74) *Attorney, Agent, or Firm* — Sughrue Mion, PLLC (57) ABSTRACT

An abnormality detection device is configured to acquire a first image, which is obtained when a vehicle-mounted camera of a first vehicle images a second vehicle different from the first vehicle, and detect an abnormal state of a driver of the second vehicle based on an image of the driver of the second vehicle which is included in the first image.

6 Claims, 6 Drawing Sheets (56) References Cited

U.S. PATENT DOCUMENTS

| | | | | |
|---|---|---|---|---|
| 2011/0273527 | A1* | 11/2011 | Liu | B60R 1/12 |
| | | | | 348/36 |
| 2013/0088369 | A1* | 4/2013 | Yu | B60W 40/09 |
| | | | | 340/905 |
| 2014/0184797 | A1* | 7/2014 | Ko | H04N 21/23418 |
| | | | | 348/148 |
| 2015/0206434 | A1* | 7/2015 | Shimotani | G08G 1/163 |
| | | | | 701/36 |
| 2015/0353014 | A1* | 12/2015 | Li | G06K 9/00845 |
| | | | | 348/148 |
| 2016/0114806 | A1* | 4/2016 | Ao | B60Q 9/00 |
| | | | | 348/148 |
| 2016/0210857 | A1* | 7/2016 | Gao | G08G 1/166 |
| 2017/0001648 | A1* | 1/2017 | An | G08B 21/06 |
| 2017/0032517 | A1* | 2/2017 | Akasaka | B60R 1/00 |
| 2017/0076605 | A1 | 3/2017 | Suzuki et al. | |
| 2017/0200061 | A1* | 7/2017 | Julian | G06K 9/00845 |
| 2018/0037162 | A1 | 2/2018 | Yonezawa et al. | |
| 2018/0137377 | A1* | 5/2018 | Nishida | G08G 1/0129 |
| 2018/0173974 | A1* | 6/2018 | Chang | G06T 5/20 |
| 2018/0197030 | A1* | 7/2018 | Yamataka | G06K 9/00845 |
| 2018/0334097 | A1* | 11/2018 | Ishibashi | B60N 2/002 |
| 2019/0364426 | A1* | 11/2019 | Muthukrishnan | B60R 13/10 |
| 2020/0079386 | A1* | 3/2020 | Kim | B60W 10/30 |
| 2020/0272950 | A1* | 8/2020 | Xu | G06Q 10/06314 |

FOREIGN PATENT DOCUMENTS

| | | | | |
|---|---|---|---|---|
| CN | 106415693 | A | | 2/2017 |
| CN | 106415693 | A * | 2/2017 | ............... G08G 1/16 |
| CN | 107408338 | A * | 11/2017 | ........... G08G 1/0112 |
| CN | 107408338 | A | | 11/2017 |
| CN | 107833312 | A | | 3/2018 |
| CN | 108725448 | A | | 11/2018 |
| CN | 108961678 | A | | 12/2018 |
| CN | 108961678 | A * | 12/2018 | |
| CN | 110866427 | A * | 3/2020 | ............... G08G 1/07 |
| JP | 2012128561 | A * | 7/2012 | |
| JP | 2016045714 | A * | 4/2016 | ............. A61B 5/107 |
| JP | 2017016568 | A * | 1/2017 | ............ B60W 40/08 |
| JP | 2017074867 | A | | 4/2017 |
| JP | 2017111649 | A * | 6/2017 | ............. B60K 35/00 |
| JP | 2017205368 | A * | 11/2017 | |
| JP | 2018-092554 | A | | 6/2018 |

\* cited by examiner

ABNORMALITY DETECTION DEVICE, ABNORMALITY DETECTION SYSTEM, AND ABNORMALITY DETECTION PROGRAM

INCORPORATION BY REFERENCE

The disclosure of Japanese Patent Application No. 2018-231198 filed on Dec. 10, 2018 including the specification, drawings and abstract is incorporated herein by reference in its entirety.

BACKGROUND

1. Technical Field

The disclosure relates to an abnormality detection device, an abnormality detection system, and an abnormality detection program.

2. Description of Related Art

In the related art, a device monitoring the state of a driver of a vehicle has been known. For example, Japanese Unexamined Patent Application Publication No. 2018-92554 (JP 2018-92554 A) discloses a safe driving assistance device that grasps the state of a driver of a host vehicle from a video of the inside of the host vehicle which is captured by a rear-view mirror camera or the like and issues a warning based on the state of the driver of the host vehicle.

SUMMARY

The host vehicle may be hindered from traveling safely by a driver of a non-host vehicle who is in an abnormal state. It is desired to detect an abnormal state of a driver of a vehicle even in a case where a device detecting an abnormal state of the driver is not installed in the vehicle.

The disclosure provides an abnormality detection device, an abnormality detection system, and an abnormality detection program with which it is possible to detect an abnormal state of a driver of a vehicle regardless of whether a device detecting an abnormal state of the driver is installed in the vehicle or not.

A first aspect of the disclosure relates to an abnormality detection device configured to acquire a first image, which is obtained when a vehicle-mounted camera of a first vehicle images a second vehicle different from the first vehicle, and detect an abnormal state of a driver of the second vehicle based on an image of the driver of the second vehicle which is included in the first image.

A second aspect of the disclosure relates to an abnormality detection system including a first vehicle and an abnormality detection device. The abnormality detection device acquires a first image, which is obtained when a vehicle-mounted camera of a first vehicle images a second vehicle different from the first vehicle, and detects an abnormal state of a driver of the second vehicle based on an image of the driver of the second vehicle which is included in the first image.

A third aspect of the disclosure relates to an abnormality detection program causing a processor to perform a step of acquiring a first image, which is obtained when a vehicle-mounted camera of a first vehicle images a second vehicle different from the first vehicle, and a step of detecting an abnormal state of the driver of the second vehicle based on an image of the driver of the second vehicle which is included in the first image.

With the abnormality detection device, the abnormality detection system, and the abnormality detection program according to the aspects of the disclosure, it is possible to detect an abnormal state of a driver of a vehicle regardless of whether a device detecting an abnormal state of the driver is installed in the vehicle or not.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
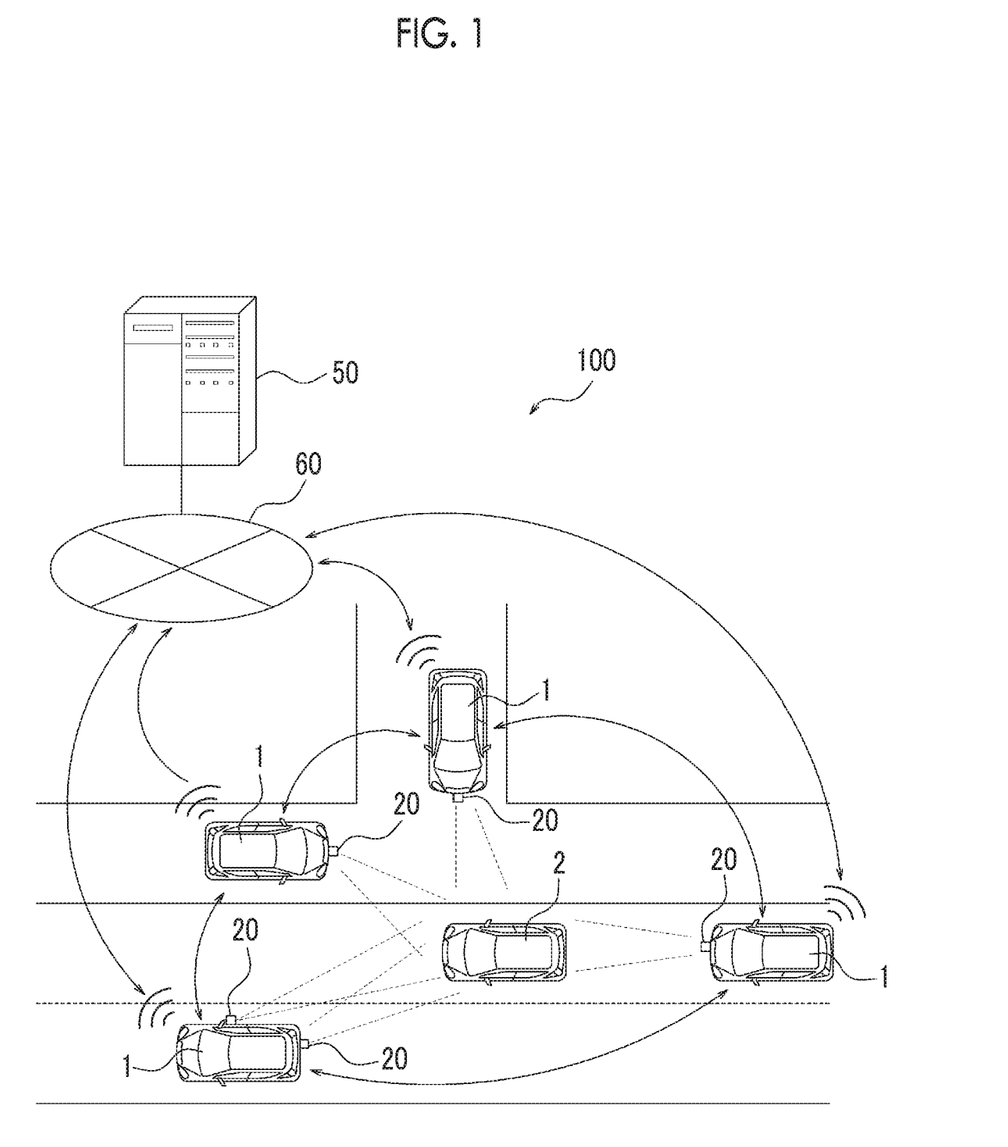
FIG. 1 is a schematic diagram illustrating an example of the configuration of an abnormality detection system according to an embodiment.
Figure 2:
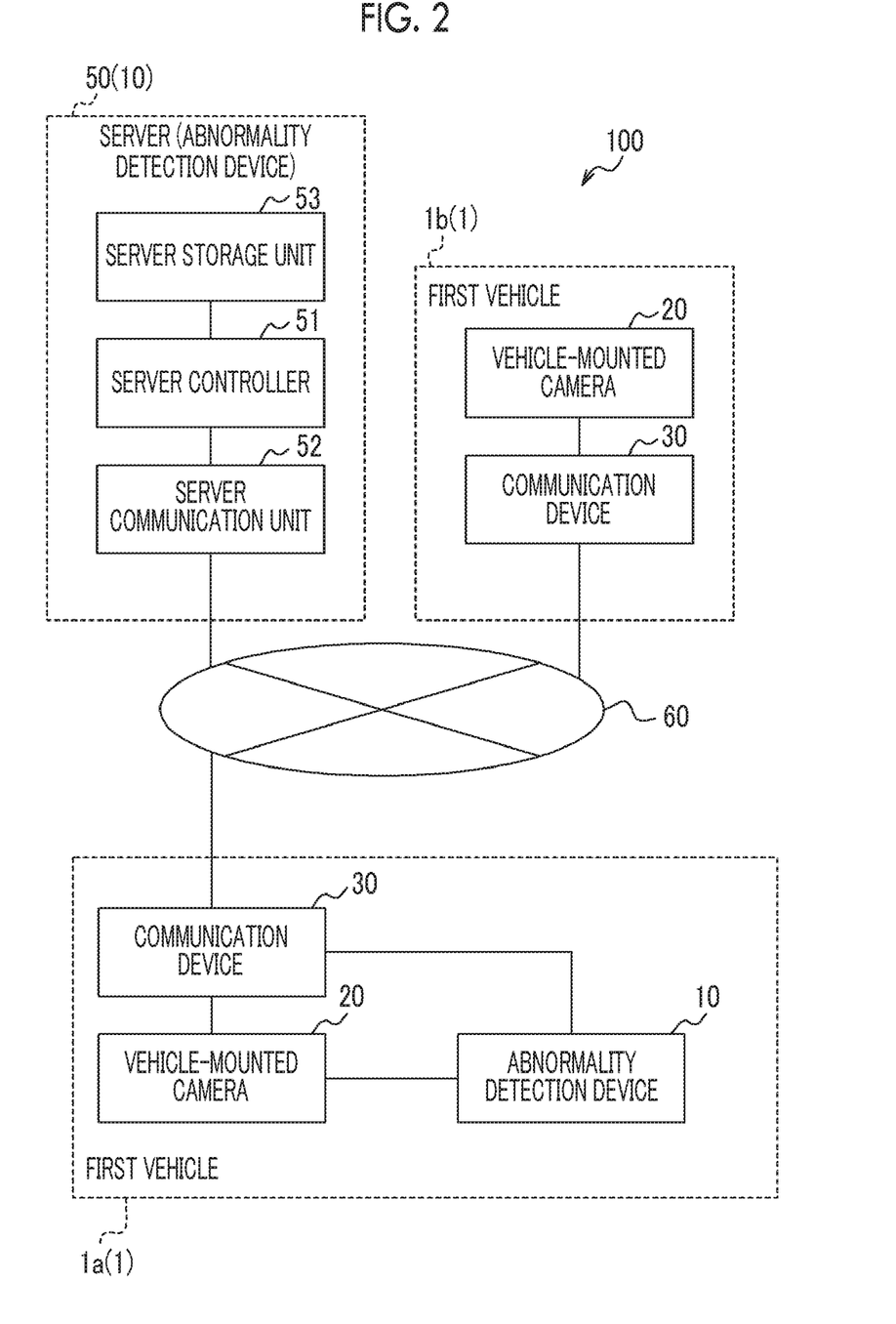
FIG. 2 is a block diagram illustrating a schematic example of the configuration of the abnormality detection system according to the embodiment.

As shown in FIGS. 1 and 2, an abnormality detection system 100 according to an embodiment is provided with a first vehicle 1. The abnormality detection system 100 may be provided with a plurality of the first vehicles 1. The following description will be made on an assumption that the first vehicles 1 can communicate with each other. Each first vehicle 1 may communicate with another first vehicle 1 via a network 60 and may directly communicate with the other first vehicle 1 not via the network 60. The abnormality detection system 100 may be further provided with a server 50. The following description will be made on an assumption that first vehicle 1 can communicate with the server 50. The first vehicle 1 may communicate with the server 50 via the network 60.

The first vehicle 1 is provided with a vehicle-mounted camera 20. The vehicle-mounted camera 20 is a camera installed in the first vehicle 1 and images targets positioned in the vicinity of the first vehicle 1. The targets to be imaged by the vehicle-mounted camera 20 include a driver of a vehicle other than a host vehicle. The abnormality detection system 100 can detect an abnormal state of the driver based on an image of the driver of the vehicle other than the host vehicle that is captured by the vehicle-mounted camera 20. The vehicle driven by the driver who is the target of state detection performed by the abnormality detection system 100 will be referred to as a second vehicle 2. In other words, the abnormality detection system 100 causes the vehicle-mounted camera 20 to image the second vehicle 2 as a monitoring target. The first vehicles 1 may share an image of the second vehicle 2 which is captured by the vehicle-mounted camera 20 between the first vehicles 1 and the first vehicles 1 may transmit the image to the server 50. The first vehicle 1 may be referred to as a monitoring vehicle. The second vehicle 2 may be referred to as a monitoring target vehicle. The first vehicle 1 and the second vehicle 2 are, for example, automobiles. However, the first vehicle 1 and the second vehicle 2 are not limited to automobiles and the first vehicle 1 and the second vehicle 2 may be any vehicles.

The abnormality detection system 100 is provided with an abnormality detection device 10. The abnormality detection device 10 may be realized by one or more processors. The abnormality detection device 10 may be provided with a controller including one or more processors. The "processors" in the present embodiment are general-purpose processors, dedicated processors dedicated for a specific process, or the like. However, the processors are not limited thereto. The abnormality detection device 10 may be installed in the first vehicle 1. In a case where the abnormality detection device 10 is installed in the first vehicle 1, the abnormality detection device 10 may be realized as a portion of the functions of an electronic control unit (ECU) of the first vehicle 1. In a case where the abnormality detection system 100 is provided with the server 50, the abnormality detection device 10 may be realized as a portion of the functions of the server 50.

The first vehicle 1 in which the abnormality detection device 10 is installed will be referred to as a first vehicle 1a. In the first vehicle 1a, the abnormality detection device 10, the vehicle-mounted camera 20, and a communication device 30 are installed. The first vehicle 1 in which no abnormality detection device 10 is installed will be referred to as a first vehicle 1b. In the first vehicle 1b, the vehicle-mounted camera 20 and the communication device 30 are installed. The abnormality detection device 10, the vehicle-mounted camera 20, and the communication device 30 are connected to each other such that the abnormality detection device 10, the vehicle-mounted camera 20, and the communication device 30 can communicate with each other via a vehicle-mounted network such as a controller area network (CAN) or a dedicated line.

The communication device 30 communicates with the communication device 30 installed in another first vehicle 1. The communication device 30 may communicate with the communication device 30 installed in the other first vehicle 1 via the network 60. In the present embodiment, the following description will be made on an assumption that the first vehicles 1 communicate with each other via the network 60. The communication device 30 may communicate with the server 50 via the network 60. The communication device 30 may be a vehicle-mounted communication machine such as a data communication module (DCM), for example. The communication device 30 may include a communication module connected to the network 60. The communication module may include a communication module conforming to mobile communication standards such as the 4th Generation (4G) and the 5th Generation (5G). However, the disclosure it not limited thereto.

The server 50 is provided with a server controller 51, a server communication unit 52, and a server storage unit 53. The server controller 51 may include one or more processors. The server communication unit 52 may include a communication module and may communicate with the communication device 30 of the first vehicle 1. The server storage unit 53 may include one or more memories. In the present embodiment, the "memories" are semiconductor memories, magnetic memories, optical memories, or the like. However, the memories are not limited thereto. Each memory included in the server storage unit 53 may function as a main storage device, an auxiliary storage device, or a cache memory, for example. The server storage unit 53 may include an electromagnetic storage medium such as a magnetic disk. The server storage unit 53 stores random information used to operate the server 50. For example, the server storage unit 53 may store a system program, an application program, or the like.

The vehicle-mounted camera 20 images a target positioned in the vicinity of the first vehicle 1 or positioned in a vehicle cabin. An image captured by the vehicle-mounted camera 20 may be referred to as a vehicle-mounted camera image. The vehicle-mounted camera image may include a still image and may include a moving image.

Figure 3:
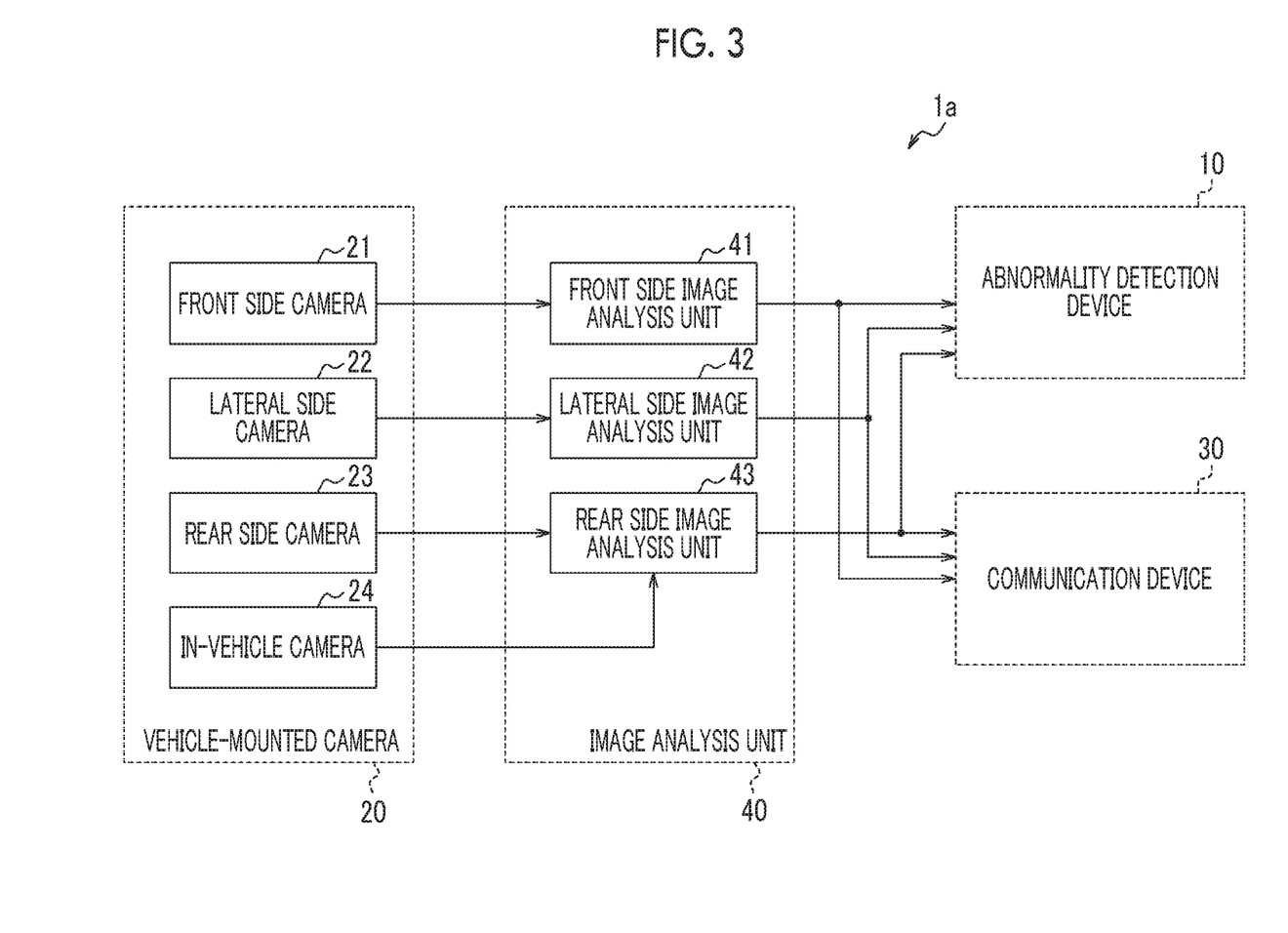
FIG. 3 is a block diagram illustrating an example of the configuration of a vehicle provided with an abnormality detection device.

The vehicle-mounted camera 20 may be provided with at least one of a front side camera 21, a lateral side camera 22, a rear side camera 23 and an in-vehicle camera 24 as shown in FIG. 3. The front side camera 21 images a target positioned in front of the first vehicle 1. An image captured by the front side camera 21 may be referred to as a front side image. The lateral side camera 22 images a target positioned beside the first vehicle 1. An image captured by the lateral side camera 22 may be referred to as a lateral side image. The rear side camera 23 images a target positioned behind the first vehicle 1. An image captured by the rear side camera 23 may be referred to as a rear side image. The in-vehicle camera 24 images a target positioned inside the vehicle cabin of the first vehicle 1 and a target positioned behind the first vehicle 1. An image captured by the in-vehicle camera 24 may be referred to as an in-vehicle image.

The vehicle-mounted camera 20 may output the vehicle-mounted camera image to the abnormality detection device 10 in the host vehicle. The vehicle-mounted camera 20 may output, via the communication device 30, the vehicle-mounted camera image to the abnormality detection device 10 installed in another first vehicle 1a or the server 50 that realizes the functions of the abnormality detection device 10.

The abnormality detection device 10 analyzes the vehicle-mounted camera image acquired from the vehicle-mounted camera 20. The abnormality detection device 10 detects an image of the second vehicle 2, which is a monitoring target, from the vehicle-mounted camera image. The abnormality detection device 10 may detect, as the image of the second vehicle 2, a vehicle image that is included in the vehicle-mounted camera image and satisfies predetermined conditions. The predetermined conditions may be referred to as monitoring target determination conditions. The monitoring target determination conditions may include a condition for determination on whether an image included in the vehicle-mounted camera image corresponds to the second vehicle 2 or not such as the position or movement of a vehicle, the appearance of a vehicle such as the shape or color of the vehicle, or the registration number of a vehicle. The monitoring target determination conditions may be set in advance or may be acquired from another machine. The vehicle-mounted camera image including the image of the second vehicle 2 will be referred to as a first image.

The abnormality detection device 10 may detect, as the first image, a front view image of a driver of the second vehicle 2 traveling as an oncoming vehicle from the front side image. The abnormality detection device 10 may detect, as the first image, a rear view image of the driver of the second vehicle 2 traveling in front of the host vehicle from the front side image. The abnormality detection device 10 may detect, as the first image, a lateral view image of the driver of the second vehicle 2 traveling in parallel to the host vehicle at a plurality of lanes from the lateral side image. The abnormality detection device 10 may detect, as the first image, a front view image of the driver of the second vehicle 2 traveling behind the host vehicle from the rear side image or the in-vehicle image.

The abnormality detection device 10 may detect information relating to the driver of the second vehicle 2 based on the first image. The information relating to the driver of the second vehicle 2 may be referred to as driver information. The driver information may include information relating to the face, the posture, or the behavior of the driver of the second vehicle 2. The abnormality detection device 10 may detect the driver information based on the first images in which the driver of the second vehicle 2 as seen from a plurality of viewpoints is shown.

As shown in FIG. 3, the first vehicle 1 may be provided with an image analysis unit 40 that analyzes the vehicle-mounted camera image. The image analysis unit 40 may be realized by one or more processors. The image analysis unit 40 may be included in the vehicle-mounted camera 20. The image analysis unit 40 may include a front side image analysis unit 41 that acquires the front side image from the front side camera 21 and analyzes the front side image. The image analysis unit 40 may include a lateral side image analysis unit 42 that acquires the lateral side image from the lateral side camera 22 and analyzes the lateral side image. The image analysis unit 40 may include a rear side image analysis unit 43 that acquires the rear side image from the rear side camera 23, acquires the in-vehicle image from the in-vehicle camera 24, and analyzes the rear side image and an image of a target behind the first vehicle 1 that is included in the in-vehicle image.

The image analysis unit 40 may extract an image including the second vehicle 2 or a vehicle other than the second vehicle 2 from the vehicle-mounted camera image and output the image. The image including the second vehicle 2 or a vehicle other than the second vehicle 2 which is extracted by the image analysis unit 40 may be referred to as a vehicle extraction image. The image analysis unit 40 may extract the first image including the second vehicle 2 from the vehicle-mounted camera image based on the monitoring target determination conditions and may output the first image as the vehicle extraction image. The image analysis unit 40 may output the vehicle extraction image to the abnormality detection device 10 in the host vehicle. The image analysis unit 40 may output, via the communication device 30, the vehicle extraction image to the abnormality detection device 10 installed in another first vehicle 1a or the server 50 that realizes the functions of the abnormality detection device 10. Since the abnormality detection device 10 acquires an image including the second vehicle 2 or the driver of the second vehicle 2 from the image analysis unit 40 as the vehicle extraction image, a portion of an image analysis process performed by the abnormality detection device 10 may be omitted. As a result, the load on the abnormality detection device 10 is reduced.

The image analysis unit 40 may detect the driver information based on the vehicle-mounted camera image. The image analysis unit 40 may output the driver information to the abnormality detection device 10 in the host vehicle. The image analysis unit 40 may output, via the communication device 30, the driver information to the abnormality detection device 10 installed in another first vehicle 1a or the server 50 that realizes the functions of the abnormality detection device 10. Since the abnormality detection device 10 acquires the driver information from the image analysis unit 40, a portion of the image analysis process performed by the abnormality detection device 10 may be omitted. As a result, the load on the abnormality detection device 10 is reduced.

In a case where the vehicle-mounted camera 20 or the image analysis unit 40 is installed in the first vehicle 1a along with the abnormality detection device 10, the vehicle-mounted camera 20 or the image analysis unit 40 may output the vehicle-mounted camera image, the vehicle extraction image, or the driver information to the abnormality detection device 10 inside the first vehicle 1a. That is, the abnormality detection device 10 may acquire the vehicle-mounted camera image, the vehicle extraction image, or the driver information inside the first vehicle 1a. Meanwhile, the abnormality detection device 10 installed in the first vehicle 1a may acquire the vehicle-mounted camera image, the vehicle extraction image, or the driver information from the first vehicle 1 other than the first vehicle 1a in which the abnormality detection device 10 itself is installed.

In a case where the first vehicle 1 is provided with the vehicle-mounted camera 20 and the image analysis unit 40, the image analysis unit 40 may output both of the vehicle-mounted camera image or the vehicle extraction image and the driver information. In a case where the abnormality detection device 10 acquires both of the vehicle-mounted camera image or the vehicle extraction image and the driver information, the abnormality detection device 10 may compare the driver information that is obtained by analyzing the vehicle-mounted camera image or the vehicle extraction image and the driver information acquired from the image analysis unit 40. In this case, the precision of driver information analysis may be improved. In a case where the abnormality detection device 10 acquires both of the vehicle-mounted camera image or the vehicle extraction image and the driver information, the abnormality detection device 10 may detect, based on the vehicle-mounted camera image or the vehicle extraction image, a part of the driver information that is not analyzed by the image analysis unit 40. In this case, more detail driver information may be detected.

In a case where the first vehicle 1 is provided with the vehicle-mounted camera 20 and the image analysis unit 40, the first vehicle 1 may output, from the image analysis unit 40, the driver information solely. In a case where the first vehicle 1 outputs the driver information solely, the load on the image analysis unit 40 communicating with the abnormality detection device 10 may be reduced. In addition, the load caused by image analysis in the abnormality detection device 10 may be reduced.

In a case where the first vehicle 1 is not provided with the image analysis unit 40 as described above, the first vehicle 1 outputs the vehicle-mounted camera image from the vehicle-mounted camera 20. The abnormality detection device 10 can acquire the driver information by analyzing the vehicle-mounted camera image. When the first vehicle 1 is not provided with the image analysis unit 40, the configuration is simplified.

The first vehicle 1 outputs at least one of the vehicle-mounted camera image captured by the vehicle-mounted camera 20, the vehicle extraction image extracted from the vehicle-mounted camera image in the image analysis unit 40, and the driver information analyzed in the image analysis unit 40. Information including at least one of the vehicle-mounted camera image, the vehicle extraction image, and the driver information may be referred to as camera output information. The first vehicle 1a in which the abnormality detection device 10 is installed may output the camera output information to the abnormality detection device 10 inside the host vehicle and may output the camera output information to the server 50. The first vehicle 1*b* in which no abnormality detection device 10 is installed may output the camera output information to the abnormality detection device 10 installed in the first vehicle 1*a* and may output the camera output information to the server 50.

In a case where the camera output information includes the vehicle-mounted camera image or the vehicle extraction image, the abnormality detection device 10 detects the driver information based on the vehicle-mounted camera image or the vehicle extraction image. In a case where the camera output information includes the driver information, the abnormality detection device 10 extracts the driver information from the camera output information. The abnormality detection device 10 detects an abnormal state of the driver of the second vehicle 2 based on the driver information. A configuration with which the abnormality detection device 10 detects an abnormal state of the driver of the second vehicle 2 will be described later.

Figure 4:
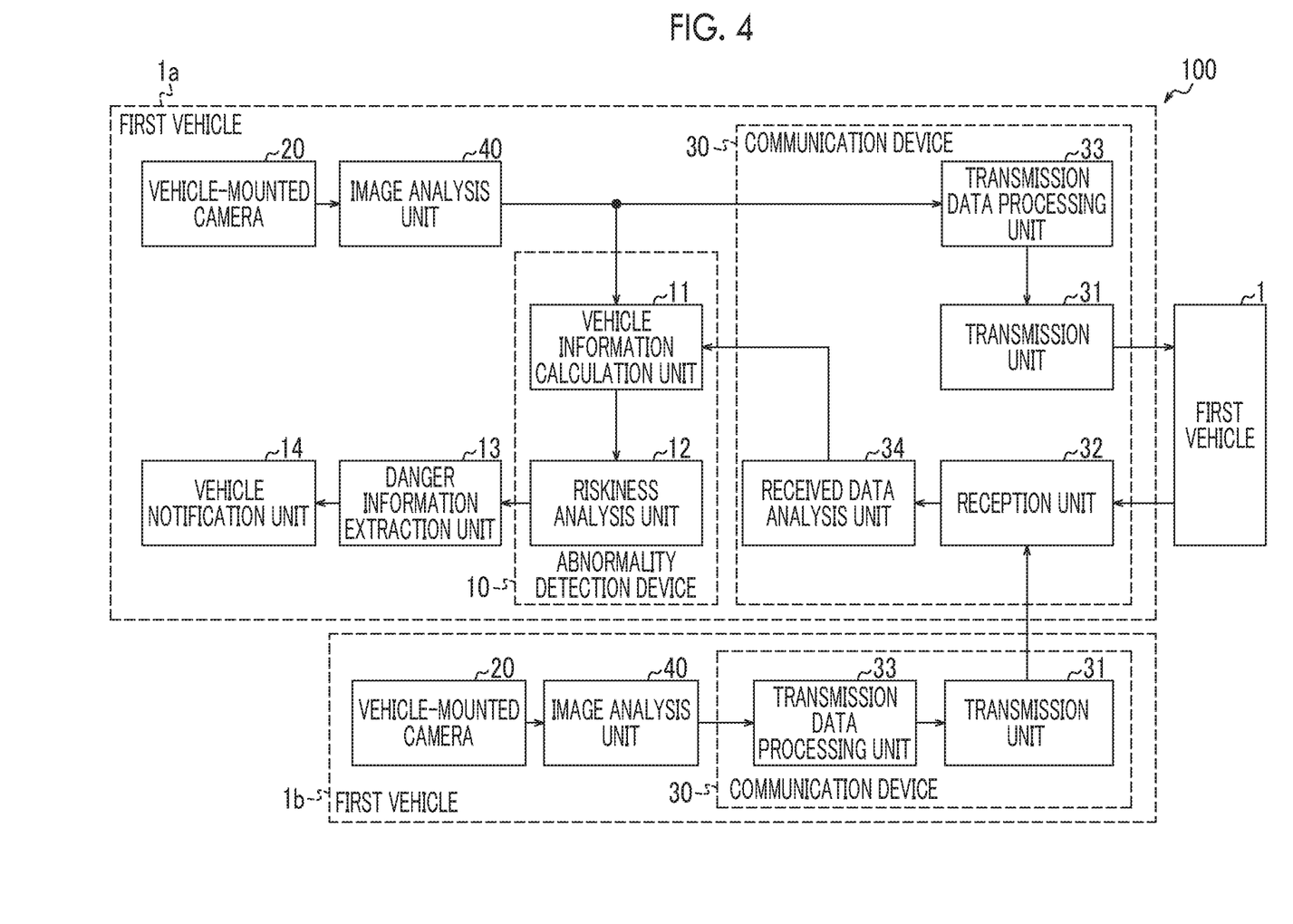
FIG. 4 is a block diagram illustrating an example of the configuration of the abnormality detection system including the vehicle provided with the abnormality detection device.
Figure 5:
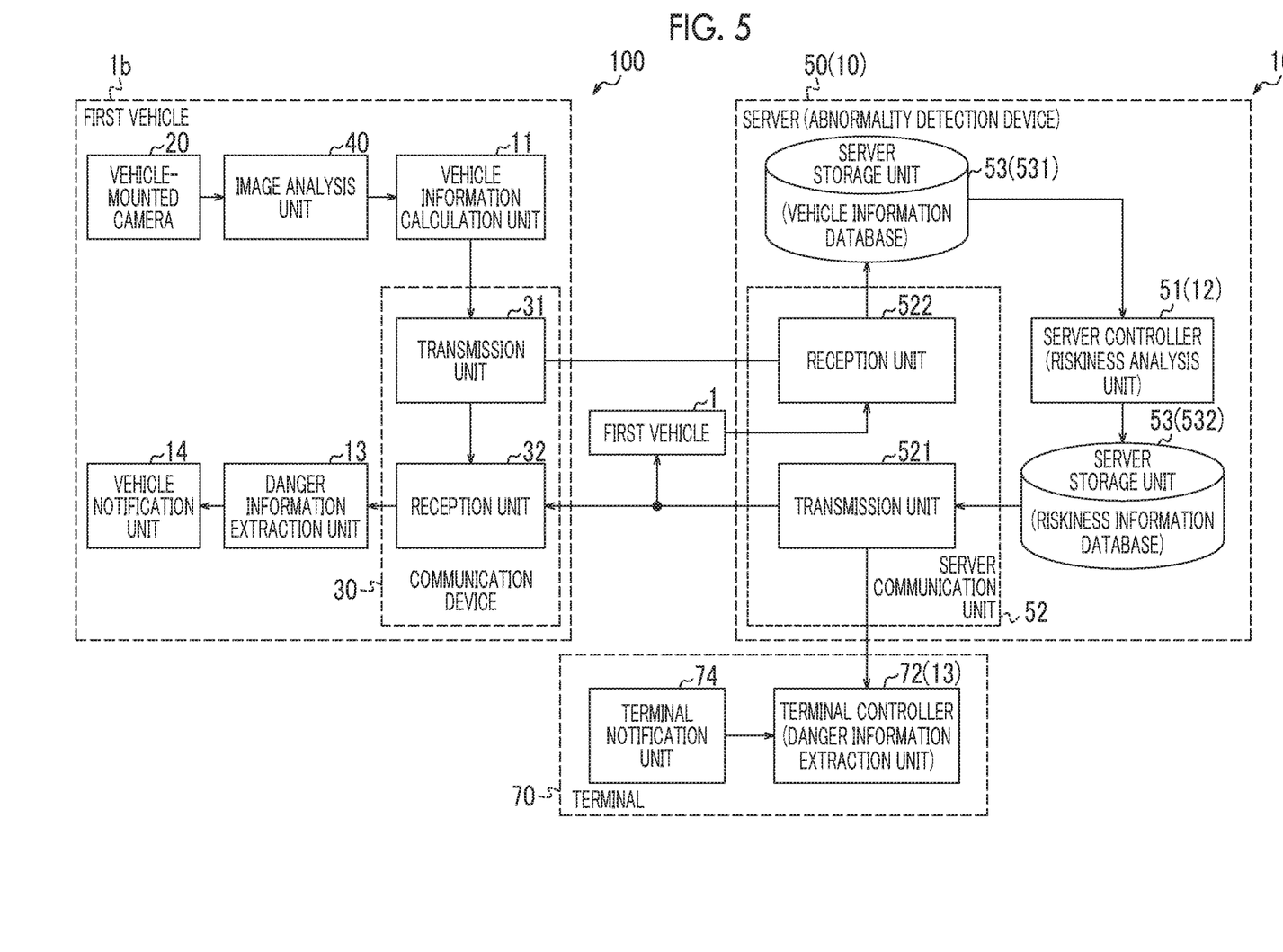
FIG. 5 is a block diagram illustrating an example of the configuration of the abnormality detection system in which a server realizes the functions of the abnormality detection device.

FIGS. 4 and 5 illustrate block diagrams showing configuration examples of the abnormality detection system 100 provided with the abnormality detection device 10 in more detail.

As shown in FIG. 4, the first vehicle 1 may be provided with the abnormality detection device 10. The first vehicle 1*a* provided with the abnormality detection device 10 may be provided with a vehicle information calculation unit 11 and a riskiness analysis unit 12 as the abnormality detection device 10. The first vehicle 1*a* is further provided with the vehicle-mounted camera 20 and the communication device 30. The first vehicle 1*b* provided with no abnormality detection device 10 is provided with the vehicle-mounted camera 20 and the communication device 30. The first vehicle 1*a* or 1*b* may be further provided with the image analysis unit 40. The first vehicle 1*a* or 1*b* may be further provided with a danger information extraction unit 13. The first vehicle 1*a* or 1*b* may be further provided with a vehicle notification unit 14.

As shown in FIG. 5, the server 50 may realize the functions of the abnormality detection device 10. The server 50 is provided with the server controller 51, the server communication unit 52, and the server storage unit 53 as shown in FIG. 2. The server controller 51 may realize the functions of the riskiness analysis unit 12 which will be described later. The server communication unit 52 may be provided with a transmission unit 521 transmitting data to the first vehicle 1 and a reception unit 522 receiving data from the first vehicle 1. The server storage unit 53 may realize the functions of a vehicle information database 531 and the functions of a riskiness information database 532 which will be described later.

The server 50 may be connected to a terminal 70 via the server communication unit 52 such that the server 50 can communicate with the terminal 70. The terminal 70 may be a portable terminal such as a smartphone. The terminal 70 may be carried by a pedestrian. The terminal 70 may be carried by a driver of the first vehicle 1 or a fellow passenger. The terminal 70 may be provided with a terminal controller 72 functioning as the danger information extraction unit 13 and a terminal notification unit 74.

The communication device 30 may be provided with a transmission unit 31 and a reception unit 32. The transmission unit 31 transmits data to another first vehicle 1. The reception unit 32 receives data from the other first vehicle 1. The communication device 30 may be provided with a transmission data processing unit 33. The transmission data processing unit 33 generates data transmittable to the other first vehicle 1 based on the camera output information acquired from the vehicle-mounted camera 20 or the image analysis unit 40. The transmission data processing unit 33 may be included in the first vehicle 1 as a configuration separated from the communication device 30. The communication device 30 may be provided with a received data analysis unit 34. The received data analysis unit 34 extracts the camera output information from data received from another first vehicle 1 and outputs the camera output information. The received data analysis unit 34 may be included in the first vehicle 1 as a configuration separated from the communication device 30.

The following description will be made on an assumption that the abnormality detection device 10 installed in the first vehicle 1*a* is provided with the vehicle information calculation unit 11 and the riskiness analysis unit 12 as shown in FIG. 4. The following description will be made on an assumption that the first vehicle 1*b* provided with no abnormality detection device 10 is provided with the vehicle information calculation unit 11 as a configuration separated from the abnormality detection device 10 as shown in FIG. 5.

The vehicle information calculation unit 11 acquires the camera output information from the vehicle-mounted camera 20, the image analysis unit 40, or the communication device 30. In a case where the camera output information includes the driver information, the vehicle information calculation unit 11 extracts the driver information from the camera output information. In a case where the camera output information does not include the driver information, the vehicle information calculation unit 11 detects the driver information based on the vehicle-mounted camera image or the vehicle extraction image included in the camera output information.

The vehicle information calculation unit 11 may detect, as the driver information, information that is possibly the grounds for determination on whether the driver of the second vehicle 2 is in an abnormal state. The vehicle information calculation unit 11 may detect information relating to the face of the driver such as the position or orientation of the face of the driver of the second vehicle 2, the driver's line of sight, the opening and closing state of the driver, or an expression on the driver's face. The vehicle information calculation unit 11 may detect information relating to a behavior of the driver such as the movement of the hands or the head of the driver of the second vehicle 2 or information on whether something is on the hands of the driver of the second vehicle 2. The vehicle information calculation unit 11 may detect the information relating to a behavior of the driver in a case where the first image is a moving image. In a case where the first image includes at least two still images captured at different timings, the vehicle information calculation unit 11 may detect the information relating to a behavior of the driver based on comparison between the still images. The vehicle information calculation unit 11 may detect information relating to the posture of the driver such as information on whether the upper body of the driver of the second vehicle 2 is straight or not, information on whether the upper body of the driver of the second vehicle 2 is on a steering wheel or not, or information on whether the upper body of the driver of the second vehicle 2 has been leaned against a seat or not.

The vehicle information calculation unit 11 may detect information relating to the second vehicle 2 from the camera output information. The information relating to the second vehicle 2 may be referred to as vehicle information. The vehicle information may include information relating to the position of the second vehicle 2 and may include information relating to a direction in which the speed vehicle proceeds or the speed of the second vehicle 2. The vehicle information may be detected by the image analysis unit 40.

In FIG. 4, the vehicle information calculation unit 11 outputs the driver information to the riskiness analysis unit 12. The vehicle information calculation unit 11 may output the vehicle information to the riskiness analysis unit 12. In FIG. 5, the vehicle information calculation unit 11 outputs the driver information to the transmission unit 31 of the communication device 30. The vehicle information calculation unit 11 may output the vehicle information to the transmission unit 31 of the communication device 30. The transmission unit 31 transmits the driver information to the server 50. The transmission unit 31 may transmit the vehicle information to the server 50. The server 50 receives the driver information with the reception unit 522, stores the driver information in the server storage unit 53 functioning as the vehicle information database 531, and outputs the driver information to the server controller 51 functioning as the riskiness analysis unit 12. The server 50 may receive the vehicle information with the reception unit 522, store the vehicle information in the server storage unit 53, and output the vehicle information to the server controller 51.

The riskiness analysis unit 12 detects an abnormal state of the driver of the second vehicle 2 based on the driver information. The riskiness analysis unit 12 may analyze the driver information to calculate a score indicating a possibility that the driver drives dangerously. The score indicating a possibility that the driver drives dangerously may be referred to as a riskiness. The calculation may be performed such that the higher the possibility that the driver drives dangerously, the higher the value of the riskiness. The calculation may be performed such that the higher the possibility that the driver drives dangerously, the lower the value of the riskiness. The calculation may be performed such that the higher the possibility that the driver drives dangerously, the higher the absolute value of the riskiness.

In the present embodiment, the higher the possibility that the driver drives dangerously, the higher the value of the riskiness. The riskiness analysis unit 12 may perform the calculation such that the value of the riskiness becomes high in a case where a determination is made that a direction which the face of the driver of the second vehicle 2 is faces or the line of sight of the driver of the second vehicle 2 is not parallel to a direction in which the second vehicle 2 proceeds. The riskiness analysis unit 12 may perform the calculation such that the value of the riskiness becomes high in a case where a determination is made that a machine such as a portable terminal is on a hand of the driver of the second vehicle 2. The disclosure is not limited to those examples and the riskiness analysis unit 12 may calculate the riskiness based on various kinds of information included in the driver information. The riskiness analysis unit 12 may determine that the driver of the second vehicle 2 is in an abnormal state in a case where the calculated riskiness satisfies predetermined conditions. The predetermined conditions may include a condition that the riskiness is equal to or greater than a predetermined value.

In FIG. 4, the riskiness analysis unit 12 outputs the result of detection relating to an abnormal state of the driver of the second vehicle 2 to the danger information extraction unit 13. The result of detection relating to an abnormal state of the driver of the second vehicle 2 may be referred to as a driver state detection result. The riskiness analysis unit 12 of the abnormality detection device 10 installed in the first vehicle 1a may output the driver state detection result to another first vehicle 1 and may output the driver state detection result to the server 50. In FIG. 5, the riskiness analysis unit 12 stores the driver state detection result in the server storage unit 53 functioning as the riskiness information database 532. The server 50 outputs the driver state detection result from the riskiness information database 532 to the danger information extraction unit 13 of the first vehicle 1b or the terminal controller 72 of the terminal 70 via the transmission unit 521, the terminal controller 72 functioning as the danger information extraction unit 13. The driver state detection result may include the result of detection on whether the driver of the second vehicle 2 is in an abnormal state or not. The driver state detection result may include the riskiness calculated by the riskiness analysis unit 12.

The danger information extraction unit 13 of the first vehicle 1 may extract, from information included in the driver state detection result, information relating to the second vehicle 2 that has a possibility of influencing the host vehicle. The information relating to the second vehicle 2 that has a possibility of influencing the host vehicle may be referred to as host vehicle danger information. The danger information extraction unit 13 may output the extracted host vehicle danger information to the vehicle notification unit 14. The danger information extraction unit 13 may extract the host vehicle danger information based on the vehicle information as well. The danger information extraction unit 13 may extract the host vehicle danger information based on a positional relationship between the second vehicle 2 and the host vehicle. The danger information extraction unit 13 may extract the host vehicle danger information based on the relative speeds of the second vehicle 2 and the host vehicle. The disclosure is not limited to those examples and the danger information extraction unit 13 may extract the host vehicle danger information based on various conditions and may extract the host vehicle danger information based on a combination of a plurality of conditions. For example, the danger information extraction unit 13 may extract information relating to the second vehicle 2 as the host vehicle danger information in a case where the second vehicle 2 is positioned within a predetermined distance from the host vehicle and the second vehicle 2 approaches the host vehicle at a relative speed equal to or greater than a predetermined value.

In the terminal 70, the terminal controller 72 may function as the danger information extraction unit 13. Hereinafter, the following description will be made on an assumption that the terminal controller 72 realizes the functions of the danger information extraction unit 13. The terminal controller 72 of the first vehicle 1 may extract, from information included in the driver state detection result, information relating to the second vehicle 2 that has a possibility of influencing a person who carries the terminal 70. The person who carries the terminal 70 may be referred to as a terminal carrier. The information relating to the second vehicle 2 that has a possibility of influencing the terminal carrier may be referred to as terminal carrier danger information. The terminal controller 72 may output the extracted terminal carrier danger information to the terminal notification unit 74. The terminal controller 72 may extract the terminal carrier danger information based on a positional relationship between the second vehicle 2 and the terminal carrier. The disclosure is not limited to those examples and the terminal controller 72 may extract the terminal carrier danger information based on various conditions and may extract the terminal carrier danger information based on a combination of a plurality of conditions.

The vehicle notification unit 14 and the terminal notification unit 74 respectively acquire the host vehicle danger information and the terminal carrier danger information extracted by the danger information extraction units 13. The vehicle notification unit 14 performs notification with respect to the driver of the host vehicle by means of a warning based on the acquired host vehicle danger information. The terminal notification unit 74 performs notification with respect to the terminal carrier by means of a warning based on the acquired terminal carrier danger information.

The vehicle notification unit 14 and the terminal notification unit 74 may include display devices. The display device may display characters, figures, images, or the like indicating information of which the driver of the host vehicle or the terminal carrier is to be notified. The display device may include a light emitting device such as a light emission diode (LED). The display device may be a liquid crystal display (LCD), for example. The display device may be an organic electro-luminescence (EL) display or an inorganic EL display. The display device may be a plasma display panel (PDP). The display device is not limited to those displays and other various types of displays may also be adopted.

In a case where the vehicle notification unit 14 notifies the driver of the first vehicle 1 of information and the amount of information of which the driver is to be notified is large, the information of which the driver is to be notified may be summarized and may be shortened or symbolized in consideration of driver distraction.

The vehicle notification unit 14 and the terminal notification unit 74 may include speakers. The speaker may output a voice indicating information of which the driver of the host vehicle or the terminal carrier is to be notified. The vehicle notification unit 14 may include a vibration device. The vibration device may output a vibration pattern indicating information of which the driver of the host vehicle or the terminal carrier is to be notified. The disclosure is not limited to those examples and the vehicle notification unit 14 and the terminal notification unit 74 may include other various devices.

The driver of the first vehicle 1 can expect occurrence of danger in advance since the vehicle notification unit 14 performs notification with respect to the driver by means of a warning. As a result, a probability that the driver of the first vehicle 1 avoids a dangerous situation in a case where the dangerous situation actually occurs is increased. The terminal carrier can expect occurrence of danger in advance since the terminal notification unit 74 performs notification with respect to the terminal carrier by means of a warning. For example, in a case where the terminal carrier is a pedestrian, the terminal carrier may be endangered due to the second vehicle 2 entering a sidewalk, a pedestrian's paradise, or the like. For example, in a case where the terminal carrier is an occupant of the first vehicle 1 or another vehicle, the terminal carrier may be endangered due the second vehicle 2 approaching the host vehicle. Since the terminal carrier receives a warning based on the terminal carrier danger information, a probability that the terminal carrier can avoid a dangerous situation in a case where the dangerous situation actually occurs is increased.

As described above, the abnormality detection device 10 according to the embodiment can detect an abnormal state of the driver of the second vehicle 2 regardless of whether a device detecting an abnormal state of the driver is installed in the second vehicle 2 or not. Accordingly, in a case where the driver of the second vehicle 2 is in an abnormal state, the driver of the first vehicle 1 and a terminal holder positioned in the vicinity of the second vehicle 2 or in an area which the second vehicle 2 is expected to enter can receive information. As a result, in a case where a dangerous situation is caused by the second vehicle 2 in which the driver is in an abnormal state, damage due to the situation may be reduced.

Figure 6:
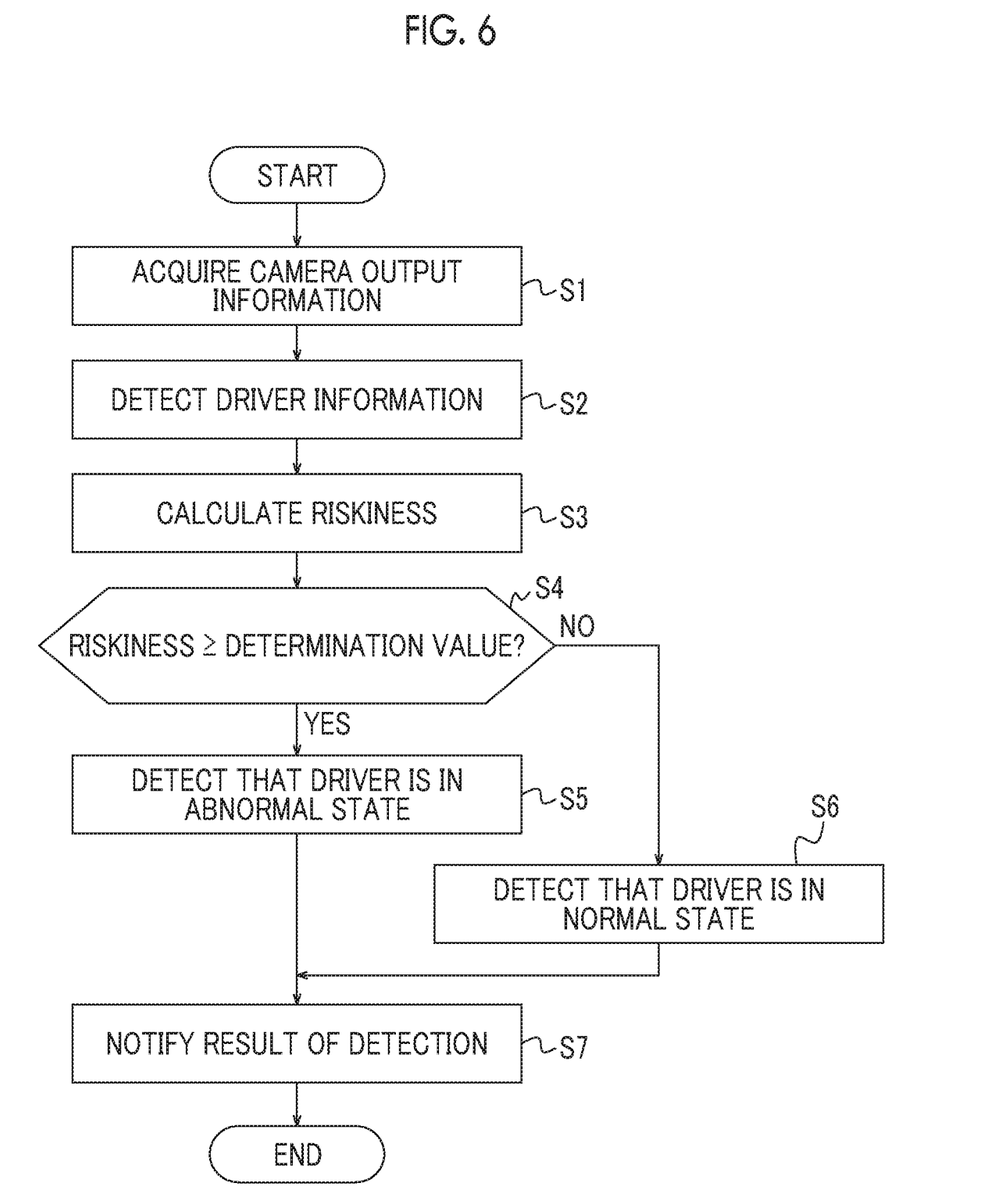
FIG. 6 is a flowchart illustrating processes in an abnormality detection method.

The abnormality detection device 10 may perform an abnormality detection method including processes as in a flowchart shown in FIG. 6 regardless of whether the abnormality detection device 10 is installed in the first vehicle 1a or is realized as a portion of the functions of the server controller 51. The abnormality detection method may be realized as an abnormality detection program executed by a processor.

The abnormality detection device 10 acquires the camera output information from the vehicle-mounted camera 20 or the image analysis unit 40 (step S1). The camera output information may include information based on the first image including the second vehicle 2.

The abnormality detection device 10 extracts the driver information from the camera output information (step S2). In a case where the camera output information includes the driver information, the vehicle information calculation unit 11 extracts the driver information from the camera output information. In a case where the camera output information does not include the driver information, the vehicle information calculation unit 11 detects the driver information based on the vehicle-mounted camera image or the vehicle extraction image included in the camera output information. The abnormality detection device 10 may detect the vehicle information from the camera output information.

The abnormality detection device 10 calculates the riskiness of a driver based on the driver information (step S3). The abnormality detection device 10 may calculate the riskiness of a vehicle.

The abnormality detection device 10 determines whether the riskiness is equal to or greater than a determination value (step S4).

In a case where the abnormality detection device 10 determines that the riskiness is equal to or greater than the determination value (YES in step S4), the abnormality detection device 10 detects that the driver is in an abnormal state (step S5). The abnormality detection device 10 performs a process in step S7 after performing the process in step S5.

In a case where the abnormality detection device 10 determines that the riskiness is not equal to or greater than the determination value (NO in step S4), the abnormality detection device 10 detects that the driver is in a normal state (step S6). In other words, in a case where the riskiness is smaller than the determination value, the abnormality detection device 10 detects that the driver is in a normal state. The abnormality detection device 10 performs a process in step S7 after performing the process in step S6.

The abnormality detection device 10 causes the vehicle notification unit 14 or the terminal notification unit 74 to perform notification about the result of detection relating to an abnormal state of the driver (step S7). In a case where the abnormality detection device 10 is installed in the first vehicle 1a, the abnormality detection device 10 may cause the vehicle notification unit 14 to perform notification by means of a warning based on the host vehicle danger information by outputting the driver state detection result to the vehicle notification unit 14 via the danger information extraction unit 13. In a case where the abnormality detection device 10 is realized as a function of the server 50, the abnormality detection device 10 may cause the vehicle notification unit 14 to perform notification by means of a warning based on the host vehicle danger information by outputting the driver state detection result to the first vehicle 1. In a case where the abnormality detection device 10 is realized as a function of the server 50, the abnormality detection device 10 may cause the terminal notification unit 74 to perform notification by means of a warning based on the terminal carrier danger information by outputting the driver state detection result to the terminal 70. The abnormality detection device 10 terminates the processes shown in the flowchart in FIG. 6 after performing the process in step S7.

The abnormality detection device 10 may omit a process of calculating the riskiness which is shown as the processes in step S3 and step S4. In this case, the abnormality detection device 10 may detect whether the driver is in an abnormal state or not based on the driver information without calculation of the riskiness.

As described above, with the abnormality detection method according to the embodiment, it is possible to detect an abnormal state of the driver of the second vehicle 2 regardless of whether a device detecting an abnormal state of the driver is installed in the second vehicle 2 or not.

The abnormality detection device 10 may detect a behavior of the driver of the second vehicle 2 as the driver information. The abnormality detection device 10 may detect the behavior of the driver of the second vehicle 2 based on the orientation of the face of the driver of the second vehicle 2. For example, in a case where the face of the driver of the second vehicle 2 faces a right side or a left side with respect to a direction in which the second vehicle 2, the abnormality detection device 10 may detect that the driver of the second vehicle 2 is looking aside while driving. For example, in a case where the face of the driver of the second vehicle 2 faces a lower side, the abnormality detection device 10 may detect that the driver of the second vehicle 2 is in a doze or the driver of the second vehicle 2 is unconscious due to a sickness or the like.

The abnormality detection device 10 may detect the behavior of the driver of the second vehicle 2 based on an object positioned in the vicinity of the face of the driver of the second vehicle 2. For example, in a case where a machine such as a cellular phone or a smartphone is in the vicinity of the face of the driver of the second vehicle 2, the abnormality detection device 10 may detect that attention of the driver of the second vehicle 2 is preoccupied with the machine.

The abnormality detection device 10 may detect, as the driver information, a direction in which the driver of the second vehicle 2 looks or an expression on the driver's face. The abnormality detection device 10 may detect an abnormal state of the driver of the second vehicle 2 based on the direction in which the driver of the second vehicle 2 looks. For example, in a case where the direction in which the driver of the second vehicle 2 looks is not fixed, the abnormality detection device 10 may detect that the driver of the second vehicle 2 is in an abnormal state. For example, the abnormality detection device 10 may detect an abnormal state of the driver of the second vehicle 2 based on an expression on the face of the driver of the second vehicle 2. The abnormality detection device 10 may determine, based on an expression on the driver's face, whether the driver of the second vehicle 2 is feeling an emotion such as anger, impatience or irritation that adversely affects driving. The abnormality detection device 10 may detect whether the driver of the second vehicle 2 is in an abnormal state based on the result of determination relating to the emotion of the driver of the second vehicle 2.

The abnormality detection device 10 may detect the posture of the driver of the second vehicle 2 as the driver information. In a case where the posture of the driver of the second vehicle 2 is inclined in any of a frontward direction, a rearward direction, a rightward direction, and a leftward direction, the abnormality detection device 10 may detect that the driver of the second vehicle 2 is in an abnormal state.

The abnormality detection device 10 may detect an abnormal state of the driver of the second vehicle 2 based on the driver information extracted from at least two first images. The abnormality detection device 10 may detect an abnormal state of the driver of the second vehicle 2 based on the driver information extracted from first images respectively acquired from at least two first vehicles 1. Since an abnormal state of the driver of the second vehicle 2 is detected based on the driver information extracted from a plurality of first images, an abnormal state of the driver becomes not likely to be erroneously detected. As a result, the precision of detection of an abnormal state of the driver is improved.

The abnormality detection device 10 may detect an abnormal state of the driver of the second vehicle 2 based on the driver information extracted from first images respectively captured at at least two different timings. In this case, an abnormal state of the driver of the second vehicle 2 may be detected chronologically. As a result, the precision of detection of an abnormal state of the driver is improved. For example, the abnormality detection device 10 may detect whether a determination has been made that the driver of the second vehicle 2 is in an abnormal state temporarily or a determination has been made that the driver of the second vehicle 2 is in an abnormal state continuously. The abnormality detection device 10 may set the riskiness of the driver higher in a case where a determination is made that the driver of the second vehicle 2 is in an abnormal state for time equal to or longer than a predetermined time. The abnormality detection device 10 may set the riskiness of the driver higher in a case where the number of times that a determination is made that the driver of the second vehicle 2 is in an abnormal state is equal to or greater than a predetermined number.

In the case of the abnormality detection system 100, it is possible to monitor the driver of the second vehicle 2 based on the vehicle-mounted camera image of the first vehicle 1 which is movable. Therefore, it is less likely to lose the second vehicle 2 while the second vehicle 2 is moving.

The embodiment of the present disclosure has been described based on the drawings and examples. However, it should be noted that various changes or modifications can be easily made by those skilled in the art based on the present disclosure. Accordingly, those changes or modifications should be construed as being included within the scope of the present disclosure. For example, the functions or the like included in each means or each step can be rearranged without logical inconsistency, and a plurality of means or steps can be combined with each other or be divided.

What is claimed is:

1. An abnormality detection device configured to acquire a first image, which is obtained when a vehicle-mounted camera of a first vehicle images a second vehicle different from the first vehicle, and detect an abnormal state of a driver of the second vehicle based on an image of the driver of the second vehicle which is included in the first image, wherein the abnormality detection device detects the abnormal state of the driver of the second vehicle based on information obtained from the image relating to a behavior of the driver of the second vehicle, calculates a riskiness of the second vehicle based on the image of the driver of the second vehicle, and outputs the riskiness of the second vehicle to the first vehicle.

2. The abnormality detection device according to claim 1, wherein the abnormality detection device detects an abnormal state of the driver of the second vehicle based on first images acquired from at least two first vehicles.

3. The abnormality detection device according to claim 1, wherein the abnormality detection device detects an abnormal state of the driver of the second vehicle based on first images captured at at least two different timings.

4. The abnormality detection device according to claim 1, wherein the vehicle-mounted camera includes at least one of a front side camera, a lateral side camera, a rear side camera, and an in-vehicle camera.

5. An abnormality detection system comprising:
  a first vehicle; and
  an abnormality detection device,
  wherein the abnormality detection device acquires a first image, which is obtained when a vehicle-mounted camera of a first vehicle images a second vehicle different from the first vehicle, and detects an abnormal state of a driver of the second vehicle based on an image of the driver of the second vehicle which is included in the first image,
  wherein the abnormality detection device detects the abnormal state of the driver of the second vehicle based on information obtained from the image relating to a behavior of the driver of the second vehicle, calculates a riskiness of the second vehicle based on the image of the driver of the second vehicle, and outputs the riskiness of the second vehicle to a display provided in the first vehicle.

6. A non-transitory computer-readable storage medium that stores an abnormality detection program causing a processor to execute a control process comprising:
  acquiring a first image, which is obtained when a vehicle-mounted camera of a first vehicle images a second vehicle different from the first vehicle, and
  detecting an abnormal state of the driver of the second vehicle based on an image of the driver of the second vehicle which is included in the first image,
  wherein the abnormality detection device detects the abnormal state of the driver of the second vehicle based on information obtained from the image relating to a behavior of the driver of the second vehicle, calculates a riskiness of the second vehicle based on the image of the driver of the second vehicle, and outputs the riskiness of the second vehicle to the first vehicle.

* * * * *